US011875047B2

United States Patent
Mody et al.

(10) Patent No.: US 11,875,047 B2
(45) Date of Patent: *Jan. 16, 2024

(54) LOCAL MEMORY USE FOR PERSPECTIVE TRANSFORM ENGINE

(71) Applicant: Texas Instruments Incorporated, Dallas, TX (US)

(72) Inventors: Mihir Narendra Mody, Bengaluru (IN); Niraj Nandan, Plano, TX (US); Rajasekhar Reddy Allu, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/084,635

(22) Filed: Dec. 20, 2022

(65) Prior Publication Data
US 2023/0117485 A1    Apr. 20, 2023

Related U.S. Application Data

(63) Continuation of application No. 17/233,361, filed on Apr. 16, 2021, now Pat. No. 11,537,299.

(60) Provisional application No. 63/011,886, filed on Apr. 17, 2020.

(51) Int. Cl.
*G06F 3/06*      (2006.01)
*G06F 13/28*     (2006.01)

(52) U.S. Cl.
CPC .......... *G06F 3/0631* (2013.01); *G06F 3/0604* (2013.01); *G06F 3/0673* (2013.01); *G06F 13/28* (2013.01)

(58) Field of Classification Search
CPC ..... G06F 3/0631; G06F 3/0604; G06F 3/0673
See application file for complete search history.

(56) References Cited

U.S. PATENT DOCUMENTS

2021/0191620 A1* 6/2021 Seyedzadehdelcheh .................... G06F 3/0608

* cited by examiner

*Primary Examiner* — David E Martinez
(74) *Attorney, Agent, or Firm* — Michael T. Gabrik; Frank D. Cimino (57) ABSTRACT

An integrated circuit includes: a local memory; and a first processing circuit coupled to the local memory. The first processing component is configured to: receive a first set of image data; perform a first image processing operation on the first set of image data to produce a second set of image data; and store at least some of the second set of image data into the local memory. The integrated circuit also includes a second processing circuit coupled to the local memory and configured to: receive at least some of the second set of image data from the local memory; and perform a second image processing operation on the second set of image data to produce a third set of image data.

20 Claims, 6 Drawing Sheets

LOCAL MEMORY USE FOR PERSPECTIVE TRANSFORM ENGINE

CROSS-REFERENCE TO RELATED APPLICATIONS

This application is a continuation of U.S. patent application Ser. No. 17/233,361, filed Apr. 16, 2021, which claims priority to U.S. Provisional Application No. 63/011,886, filed Apr. 17, 2020, each of which is incorporated by reference herein in its entirety.

BACKGROUND

As new electronic devices are developed and integrated circuit (IC) technology advances, new IC products are commercialized. One example IC product for electronic devices is an image processor with a Perspective Transform Engine (PTE), sometimes called an image "remapper". When a camera is viewing a scene from two different positions, or when multiple cameras are viewing the scene from different positions, a transformation between the two different "perspectives" may be used to align the images. These perspectives are relatable by a transformation, which captures the exact geometric relationship between input images and provides a modified output image. A typical transformation aligns and stitches multiple input frames of the same scene to compute a panoramic output image. Another transformation provides an output image from stereo input images. Another transformation removes the effect of a curved lens from or adds the effect of a curved lens to an output image. Other image processing operations may be performed before and/or after PTE operations.

Figure 1:
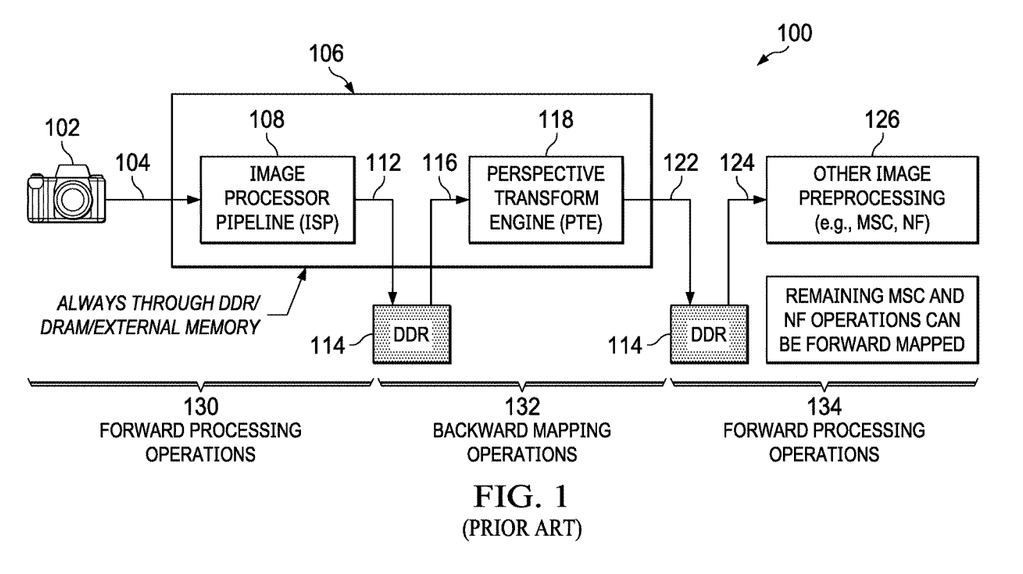
FIG. 1 is a block diagram of image processing in accordance with a conventional approach.

FIG. 1 shows a conventional image processing system 100 with a PTE 118. As shown, the image processing system 100 includes a camera 102 configured to capture and digitize images. The digital images from the camera 102 are provided to an image processor 106, which may be an IC or part of an IG. As shown, the image processor 106 includes an image processor pipeline (ISP) 108 configured to receive pixel-based transfers 104 from the camera 102. For example, an image sensor of the camera 102 may provide the pixel-based transfers 104 in line raster order to the ISP 108. The ISP 108 is configured to perform line processing on the received pixel-based transfers 104. The output 112 from the ISP 108 is line by line, and is stored in a Double Data Rate (DDR) memory 114 external to the image processor 106. The image processing operations up to the output 112 of the ISP 108 being stored in the DDR memory 114 are forward processing operations 130.

In the example of the FIG. 1, the PTE 118 receives blocks 116 of image data stored in the DDR memory 114, and performs block processing to modify the perspective of one or more input images. The operations related to the PTE 118 are backward mapping operations 132. The output 122 of the PTE 118 is stored back in the DDR memory 114. The remapped image data 124 resulting from the operations of the PTE 118 may be used by other image preprocessing 126. The other image preprocessing 126 is external to the image processor 106 in FIG. 1 and includes forward processing operations 134. Without limitation, examples of the other image preprocessing 126 includes multi-scaler (MSC) engine processing and/or noise filter (NF) processing.

Using the DDR 114 to supply the blocks 116 to the PTE 118 consumes a sign ficate amount of DDR read and write bandwidth. This results is undesirable design issues such as higher power consumption, higher latency, and/or a more expensive DDR.

SUMMARY

In at least one example, an integrated circuit comprises: In at least one example, an integrated circuit comprises: a local memory; and a first processing circuit coupled to the local memory. The first processing component is configured to: receive a first set of image data; perform a first image processing operation on the first set of image data to produce a second set of image data; and store at least some of the second set of image data into the local memory. The integrated circuit also includes a second processing circuit coupled to the local memory and configured to: receive at least some of the second set of image data from the local memory; and perform a second image processing operation on the second set of image data to produce a third set of image data.

In another example, a system comprises: an external memory; and imaging circuitry coupled to the external memory. The imaging circuitry includes: local memory; and a first processing circuit coupled to the local memory. The first processing circuit is configured to: receive a first set of image data; perform a first image processing operation on the first set of image data to produce a second set of image data; and store at least some of the second set of image data into the local memory. The image circuit also includes a second processing circuit coupled to the local memory and configured to: receive at least some of the second set of image data from the local memory; and perform a second image processing operation on the second set of image data to produce a third set of image data.

In yet another example, an image processing method comprises: determining an optimal memory allocation for operations of an image processing component of an integrated circuit; if the optimal memory allocation fits within available local memory of the integrated circuit, store input data for the image processing component in the available local memory; if the optimal memory allocation does not fit within the available local memory, store a decremented amount of input data for the image processing component in the available local memory; and perform image processing operations by the image processing component using input data obtained from the local memory.

BRIEF DESCRIPTION OF THE DRAWINGS

The same reference numbers are used in the drawings to depict the same or similar features.

DETAILED DESCRIPTION

Described herein is an image processor with an image processing circuit (e.g., a perspective transform engine (PTE) and/or other image processing circuits) configured to remap image data to account for a different perspective and/or for multiple perspectives. The image processor is part of an integrated circuit (IC) with local memory. Examples of local memory include memory dedicated to the image processor (e.g., L2 memory) and memory for the entire IC (e.g., L3 memory). In the described embodiments, local memory is used for image processing operations such as providing blocks of image data to a PTE and/or other image processing circuits. By using local (on-chip) memory instead of or in combination with external memory (e.g., double data-rate memory or DDR memory) for PTE input operations and/or other image processing operations, the amount of external memory bandwidth that is dedicated to PTE input operations and/or other image processing operations is reduced, which improves latency of the external memory for other operations. There is also the possibility of external memory cost savings. For example, the described technique may be used to design an image processing system that leverages availability of local memory to reduce the size or cost of the external memory compared to an image processing system that relies on external memory alone for PTE input operations and/or other image processing operations.

Figure 2:
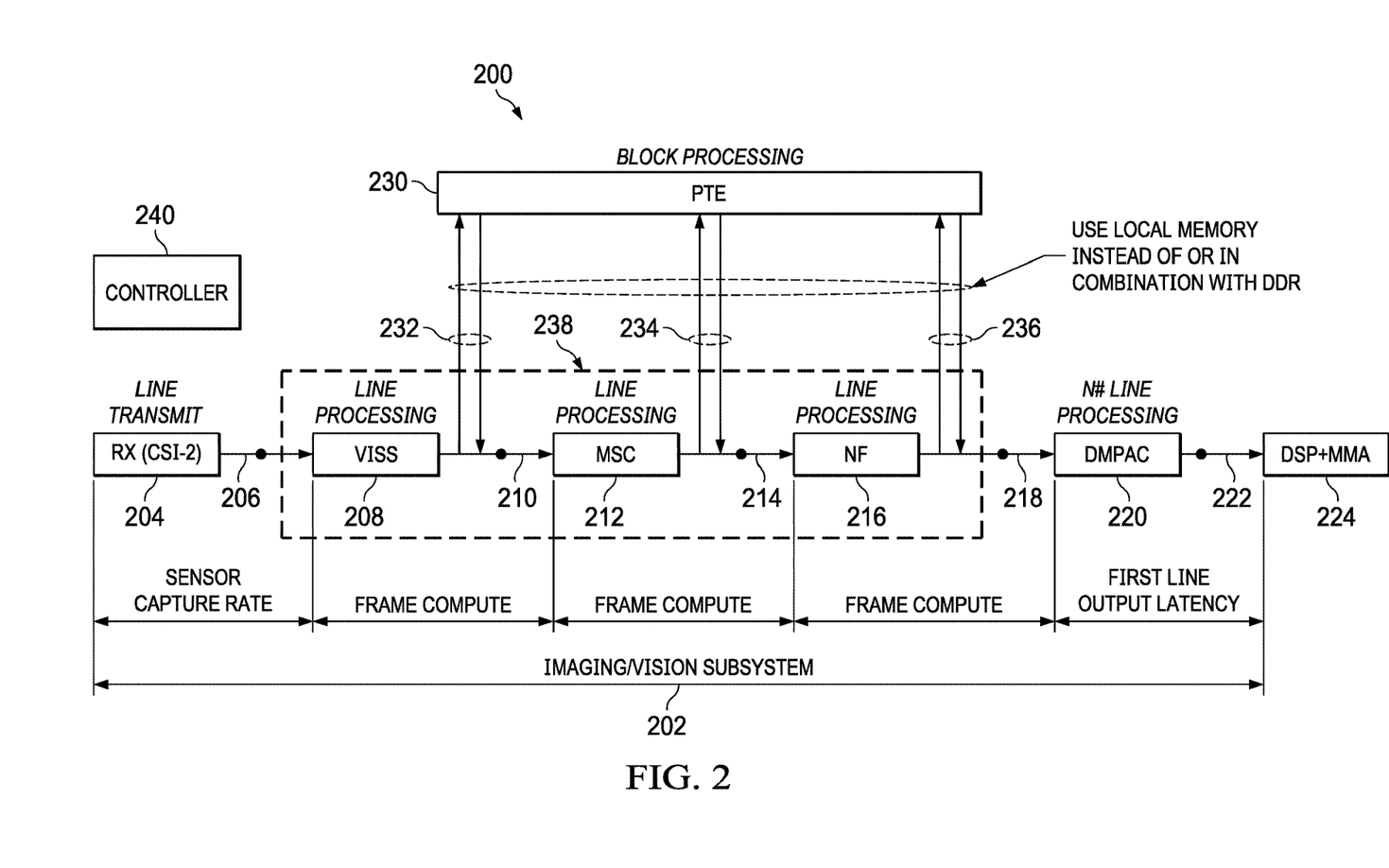
FIG. 2 is a block diagram of image processing in accordance with an example embodiment.

FIG. 2 is a block diagram of an image processing system 200 performing a method in accordance with an example embodiment. As shown, the system 200 includes circuits or interfaces/processing elements 204, 208, 212, 216, 220, 224, and 230, each of the interfaces/processing elements 204, 208, 212, 216, 220, 224, and 230 corresponding to hardware, firmware, and/or software configured to perform a different image processing function and/or data transfer function. Between the interfaces/processing elements 204, 208, 212, 216, 220, 224, and 230, data is transferred to and from memory (local and/or external). In the system 200, the use of local memory for image processing operations involves a controller 240, which may determine relevant parameters, such as: how much local memory is available, how much memory and memory bandwidth each particular interface/processing element needs, and the type (e.g., lines or blocks) and size of input data (e.g., bounding boxes) used for each particular interface/processing element.

In some example embodiments, the order of at least some the interfaces/processing elements 204, 208, 212, 216, 220, 224, and 230 of the system 200 may vary without significantly affecting the resulting image. In other example embodiments, the order of at least some the interfaces/processing elements 204, 208, 212, 216, 220, 224, and 230 of the system 200 is selected to achieve a target performance metric (e.g., image quality, latency, and/or other metrics). In the method performed by the system 200, processing element 230 uses local memory or local memory in combination with external memory for PTE input operations. In different example embodiments, the position of the processing element 230 varies relative to the processing elements 208, 212, and 216 of the line-based processing engine 238. Without limitation to other examples, processing element 208 includes an image processing pipeline (e.g., a Vision Imaging Sub-System (VISS)), processing element 212 includes a multi-scalar (MSC) engine, and processing element 216 includes a noise filter (NF). Other processing elements or fewer processing elements for the line-based processing engine 238 are possible.

In FIG. 2, the method system is an imaging/vision subsystem 202 (e.g., an image processing IC and possibly other components) to provide imaging/vision for a vehicle or other system equipped with image sensors and a display. At interface 204, image data is received (e.g., from image sensors of one or more cameras). In various examples, the interface 204 includes a camera serial interface (e.g., a CSI-2 interface), and the transfer of data over the interface 204 involves one or more line transmit operations characteristic of the interface 204. The image data may be received via the interface 204 at a rate that is based on a capture rate of a camera sensor that is used to capture the data. Indicator 206 represents the image data received via the interface 204, which may be stored in external memory (e.g., DDR memory) for use by the line-based processing engine 238. In some example embodiments, processing element 208 receives data associated with the indicator 206 from the external memory and performs image processing pipeline operations such as line processing and frame compute operations. The indicator 210 represents the results of the operations of processing element 208, which are stored in local memory and/or external memory. Without limitation to other embodiments, if PTE operations follow the operations of the processing element 208, the results (represented by indicator 210) of the processing element 108 may be partly or entirely stored in local memory for availability to the processing element 230. If the amount of available local memory is below a threshold (determined by the controller 240), some of the data related to indicator 210 is stored in external memory for availability to the processing element 230. The indicator 232 represents the results of the operations of the processing element 230 at this stage of the method. The results associated with indicator 232 are stored in local memory or external memory for use by processing elements of the line-based processing engine 238, or other subsequent image processing components. As desired and subject to availability, local memory is used for other operations besides PTE input operations (e.g., for one or more operations of the line-based processing engine 238 before or after the processing element 230).

In different example embodiments, the processing element 212 retrieves the results related to indicator 210 or the results related to indicator 232. In either case, the processing element 212 is configured to receive data from local memory or external memory and perform line processing and frame compute operations. Indicator 214 represents the results of the operations of the processing element 212. These results are stored in local memory or external memory. Without limitation to other embodiments, if PTE operations follow the processing element 212, the results related to indicator 214 may be partly or entirely stored in local memory for availability to the processing element 230. If the amount of local memory is below a threshold (determined by the controller 240), some of the results related to the indicator 214 are stored in external memory for availability to the processing element 230. The indicator 234 represents the results of the operations of processing element 230 at this stage of the method. The results related to indicator 234 are stored in local memory or external memory for use by other components of the line-based processing engine 238, or other subsequent image processing components. As desired and subject to availability, local memory is used for other operations besides PTE input operations (e.g., by one or more components of the line-based processing engine 238 before or after the processing element 230).

In some example embodiments, the processing element 216 retrieves the results related to indicator 214 or the results related to indicator 234 from local memory or external memory and performs line processing and frame compute operations. The indicator 218 represents the results of the operations of processing element 216. These results related to indicator 218 are stored in local memory or external memory. Without limitation to other embodiments, if PTE operations follow the processing element 216, the results related to indicator 218 may be partly or entirely stored in local memory for availability to the processing element 230. In such case, the results related to indicator 218 from may be partly or entirely stored in local memory for availability to the processing element 230. If the amount of local memory is below a threshold (determined by the controller 240), some of the results related to indicator 218 are stored in external memory for availability to the processing element 230. The indicator 236 represents the results of operations of the processing element 230 at this stage of the method 200. The results related to the indicator 236 are stored in local memory or external memory for use by other components of the line-based processing engine 238, or other subsequent image processing components. As desired and subject to availability, local memory is used for other operations besides PTE input operations (e.g., for one or more operations of the line-based processing engine 238 before or after the processing element 230).

At processing element 220, a depth and motion processing accelerator (DMPAC) retrieves the results related to indicators 218 or 236 from memory and performs multi-line (#N) processing operations. In some example embodiments, the operations of processing element 220 are affected by first line output latency. The indicator 222 represents the results of the operations of processing element 220. The results related to indicator 222 are stored in external memory. At processing element 224, a digital signal processor (DSP) and matrix multiplier array (MMA) retrieves the results related to indicator 222 from the external memory and performs machine vision operations.

In different example embodiments, the method performed by the system 200 may vary with regard to the particular operations performed as well the order in which they are performed. Regardless of the particular operations performs and their respective order, the processing element 230 and/or other components receives their input from local memory or a combination of local memory and external memory as described herein.

In this manner, the controller 240 may consider the input and output data of each processing element of the processing engine 238 and of the processing element 230, as well as factors such as data size relative to available local memory, memory bandwidth and other factor, to determine whether to store the data in local memory or external memory. Upon the determination, the controller 240 may send control signals to the interface/processing element providing the data and/or to the interface(s)/processing element(s) consuming the data that indicate where the data is to be stored. As needed, the controller 240 interacts with one or more interfaces between processing element(s), the local memory, and/or the external memory to organize data transfers related to the described image processing operations.

Figure 3:
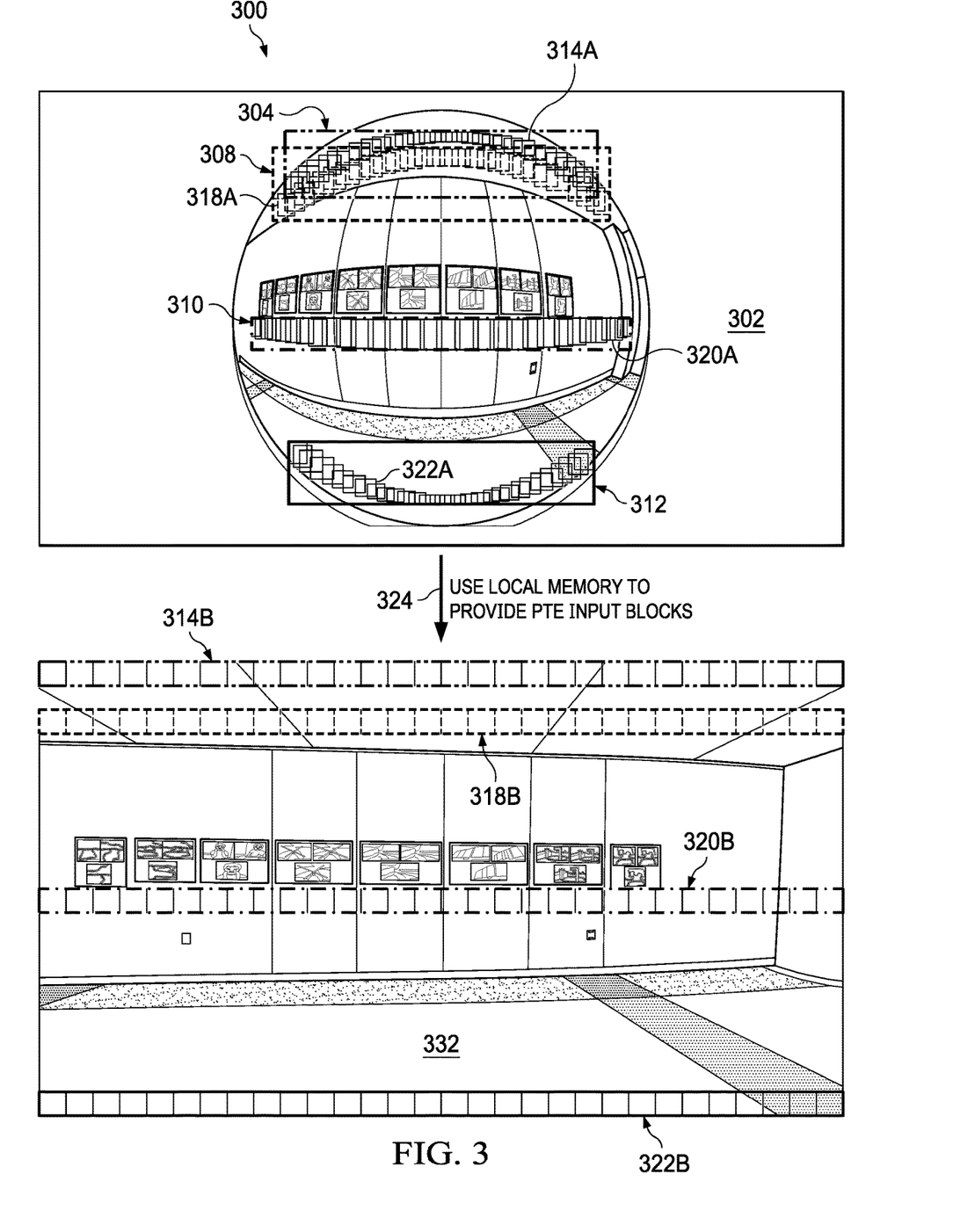
FIG. 3 is a diagram of an image and related blocks before and after perspective transform engine (PTE) operations in accordance with an example embodiment.

FIG. 3 is a diagram 300 of an image and related blocks before and after perspective transform engine operations in accordance with an example embodiment. In the diagram 300, a first image 302 is shown before PTE operations are performed. In the first image 302, various image areas or bounding boxes 304, 308, 310, and 312 with respective blocks 314A, 318A, 320A, and 322A are shown. The image areas 304, 308, 310, and 312 each include a respective target row of blocks of the first image 302. More specifically, the blocks 314A are a first target row of blocks that follow lens distortion affecting the image area 304. The blocks 318A are a second target row of blocks that follow lens distortion affecting the image area 308. The blocks 320A are a third target row of blocks that follow lens distortion affecting the image area 310. The blocks 322A are a fourth target row of blocks that follow lens distortion affecting the image area 312. In the example of FIG. 3, PTE operations 324 are performed using local memory or a combination of local memory and external memory for PTE input operations. The effect of PTE operations on the first image 302 results in the second image 332. Relative to the first image 302, the second image 332 removes or reduces the effect of lens distortion on the image. In the second image 332, blocks 314B are remapped versions of blocks 314A, blocks 318B are remapped versions of blocks 318A, blocks 320B are remapped versions of blocks 320A, and blocks 322B are remapped versions of blocks 322A. In the example of FIG. 3, the remapping provided by the PTE operations removes or reduces the lens distortion. In other example embodiments, PTE operations performed using local memory may change the perspective of an image, add distortion, change the angle or view of an image, combine perspectives obtained from different angles, and/or other perspective modifications. One example use of PTE operations is to: convert camera images of a vehicle back-up camera or other camera with lens distortion; and output an output image without lens distortion.

Figure 4:
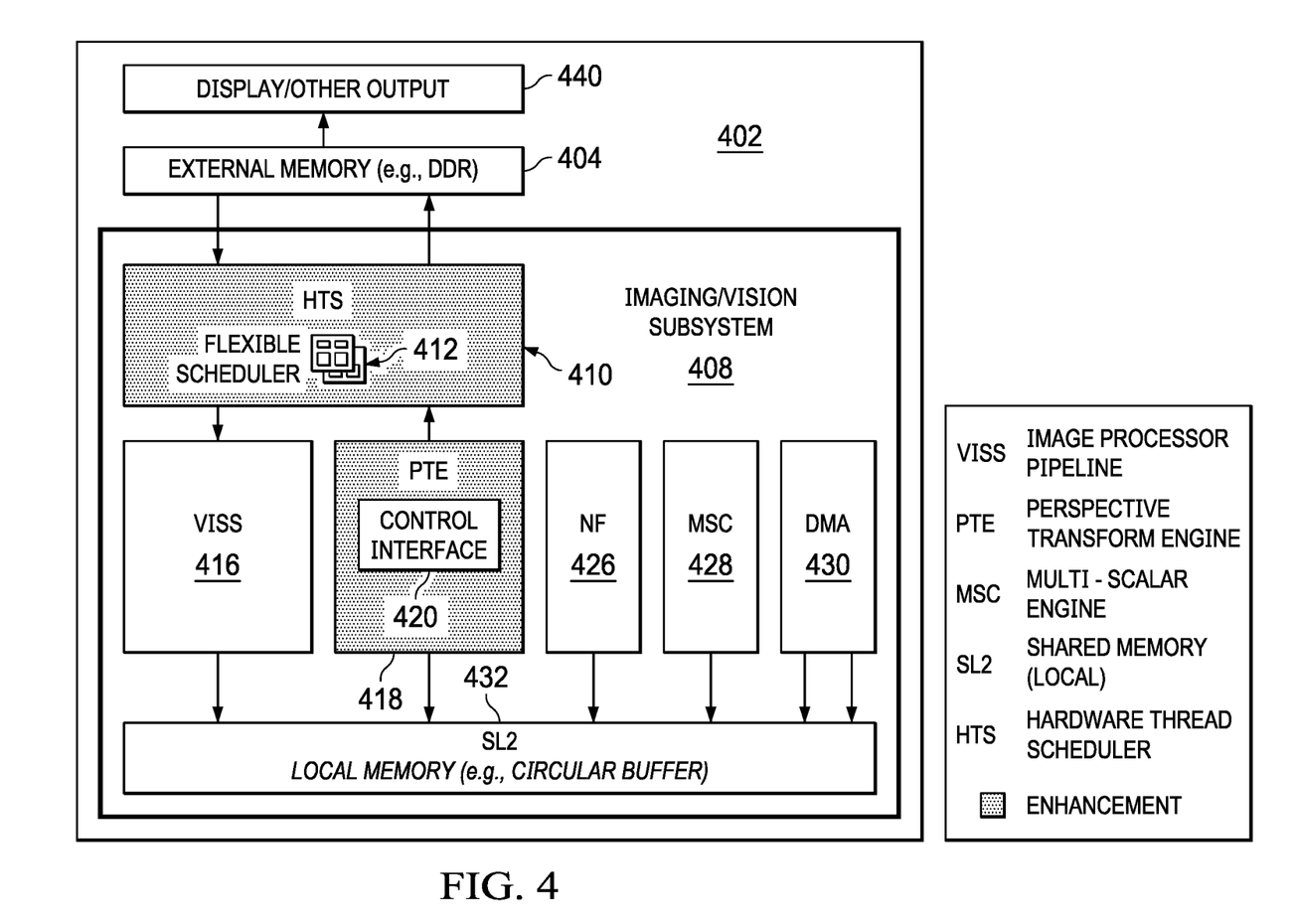
FIG. 4 is a block diagram of a system in accordance with an example embodiment.

FIG. 4 is a block diagram of a system 402 in accordance with an example embodiment. In some example embodiments, the system 402 is an electronic device with a camera (e.g., a smartphone). In other example embodiments, the system 402 is a computer, a vehicle, or other electronic device configured to perform image processing. As shown, the system 402 includes an imaging/vision subsystem 408 coupled to an external memory 404 (e.g., DDR memory). The external memory 404 is coupled to a display 440 and/or other output components. The display 440, for example, is able to display images or video with a perspective or lens effect that is different than the original images captured by a camera. The imaging/vision subsystem 408 includes one or more ICs.

In the example of FIG. 4, the imaging/vision subsystem 408 includes a VISS block 416, a PTE 418 (an example of the processing element 230 in FIG. 2), an NF block 426, MSC engine block 428, and a direct memory access (DMA) controller 430 coupled to a local memory 432 (e.g., a circular buffer or shared local memory "SL2"). In some example embodiments, the VISS block 416, MSC engine block 428, and the NF block 426 are components of a line-based processing engine (e.g., the line-based processing engine 238 in FIG. 2). The DMA controller 430 supports use of local memory (e.g., L3 memory) for PTE operations using a virtual DMA node.

In the example of FIG. 4, the PTE 418 receives at least some of its input from the local memory 432. As shown, the PTE block 418 includes a control interface 420. In some example embodiments, the control interface 420 synchronizes with the HTS 410. More specifically, the control interface 420 ensures that the PTE 418 processes the row of blocks (e.g., row of blocks 314A) only when a corresponding image area or bounding box (e.g., image area 304) is available in the local memory 432.

The imaging/vision subsystem 408 also includes a hardware task scheduler (HTS) 410 coupled to the VISS block 416 and the PTE block 418. The HTS 410 includes a scheduler 412 to help manage tasks related to the imaging/vision subsystem 408. Example tasks are used to transfer data from the external memory 404 to the VISS block 416 as well as to transfer data from the PTE block 418 to the external memory 404. In operation, the HTS 410 controls processing triggers. For example, the HTS 410 triggers the PTE 418 to start processing of the blocks when a full image area or bounding box for a related row of blocks is produced by VISS/MSC (e.g., input area 304 for blocks 314A). The HTS 410 also ensures that the VISS 416 overwrites data only after the data has consumed by a consumer (e.g., the PTE 418). The HTS 410 synchronizes the producer and consumer process control (i.e., controlling the data flow without altering the data itself). In the example of FIG. 4, data transfers happen via memory with the HTS 410 providing synchronization.

By using local memory 432 for PTE input operations instead of or in combination with the external memory 404, the amount of external memory bandwidth that is dedicated to PTE input operations is reduced. This use of the local memory 432 improves latency of the external memory 404 for other operations. There is also the possibility of costs savings for the external memory 404. For example, the external memory 404 may be smaller and/or may have less bandwidth compared to an image processing system that relies on external memory alone for PTE input operations.

Figure 5:
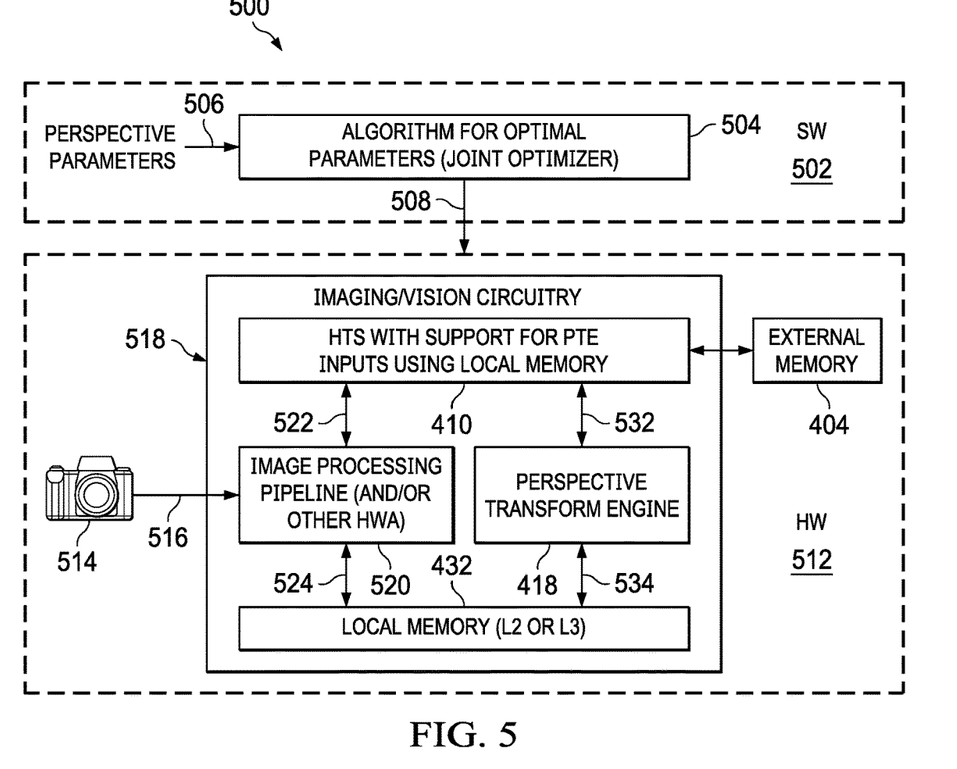
FIG. 5 is a diagram of image processing components in accordance with an example embodiment.

FIG. 5 is a diagram 500 of image processing components in accordance with an example embodiment. As shown, the diagram 500 includes software 502 with an algorithm 504 for determining optimal parameters 508 from input perspective parameters 506. Examples of the input perspective parameters 506 include transform coefficients and constraints. Example constraints include the size(s) of local memory (e.g., L2 and/or L3) and a minimum block size (e.g., height and width) for PTE operations. To determine the optimal parameters 508, the algorithm 504 uses a joint optimization that maximizes block size and minimizes local memory use. The outputs of the algorithm 504 may include, but are not limited to, a success/fail indicator, a target block size for PTE operations, and target local memory usage (e.g., target L2 and/or L3 use).

The optimal parameters 508 are provided to hardware 512. In the example of FIG. 5, the hardware 512 includes a camera 514 coupled to imaging/vision circuitry 518 (an example of the imaging/vision subsystem 408 in FIG. 4). In some example embodiments, the imaging/vision circuitry 518 is an IC. As shown, the imaging/vision circuitry 518 includes the image processing pipeline 520 (e.g., VISS 416 and/or other hardware) coupled to the PTE 418. The image processing pipeline 520 and the PTE 418 are coupled to local memory 432 (on-chip relative to the image processing pipeline 520, the PTE 418, and the HTS 410) such as L2 or L3 memories. The image processing pipeline 520 and the PTE 418 are also coupled to the HTS 410, which supports PTE input operations from the local memory 432.

In operation, the software 502 provides the optimized parameters 508 to the hardware 512. The hardware 512 uses the optimized parameters 508 to perform PTE operations, including using local memory to remap: 1) blocks or portions of image data 516 from the camera 514; and/or 2) modified image data from the image processing pipeline 520. In some example embodiments, the optimized parameters 508 provide the output block size (e.g., one rectangle of the blocks 314B).

If local memory is not available (e.g., the local memory is not large enough and/or is busy) for the block size or block size range needed for PTE operations, external memory may be used to perform PTE operations. To the extent local memory and external memory is shared between PTE operations and other operations, the HTS 410 is able to increase or decrease the priority of PTE operations relative to other operations for the local memory and/or the external memory. As appropriate, the HTS 410: 1) schedules reads/writes 524 between the local memory 432 and the image processing pipeline 520; 2) schedules reads/writes 534 between the local memory 432 and the PTE 418; 3) schedules reads/writes 522 between the external memory 404 and the image processing pipeline 520; and 4) schedules reads/writes 532 between the external memory 404 and the PTE 418.

In some example embodiments, the imaging/vision circuitry 518 supports dual data flow based on L2 and L3 memories for intermediate data storage per row of block basis. With L2 memory, there is a direct connection for reads/writes scheduled by the HTS 410. With L3 memory, a virtual connection and virtual data movement node is used for reads/writes scheduled by the HTS 410. In some example embodiments, the HTS 410 supports PTE consumer side connectivity. For example, the HTS 410 may be modified to have Luma and Chroma consumer sockets. These consumer sockets are made connectable to output sockets of the image processing pipeline 520 (or VISS block 416).

In some example embodiments, the image processing pipeline 520 is part of a line-based processing engine (e.g., the line-based processing engine 238 of FIG. 2). In these example embodiments, the line-based processing engine may include multiple components (e.g., VISS blocks 208 or 416, MSC engine blocks 212 or 428, and NF blocks 216 or 426). In such case, the position of the PTE 418 relative to the components of the line-based processing engine may vary as described for the processing element 230 in FIG. 2.

In some example embodiments, the scheduler 412 is used for aggregation and DMA functions. To support worst case line targets when starting row of block processing, the scheduler 412 may implement an aggregate function based on a M→N pattern adapter, where M is the row level line count, and N is the number of blocks in a row. The HTS 410 may also be configured to provide general connectivity to spare consumer and producer sockets.

In some example embodiments, the PTE 418 is modified (relative to a conventional PTE) to support row level processing control. With the modifications, the PTE 418 supports two modes of control with the HTS 410. One mode is for control at each block level (default) and the other mode is for control at row-of-blocks. In case of block level control, the HTS 410 will do aggregation of blocks to count row-of-blocks. In some example embodiments, the HTS 410 is configured to: schedule transfers of the input blocks from the local memory 432 to the PTE 418; and perform an aggregation function based on a row level line count and a number of blocks in each row.

With the modification, the PTE 418 waits for a start signal from the HTS 410 at the beginning of each row, where the HTS 410 ensures data dependency for the start of the row indicated by the start signal. When processing the last block of the current row, the PTE 418 stops prefetching the first block of a new row. The PTE 418 is also modified to work with the addressing scheme of a circular buffer (e.g., the local memory 432 is a circular buffer in some example embodiments) to facilitate PTE input operations.

Figure 6:
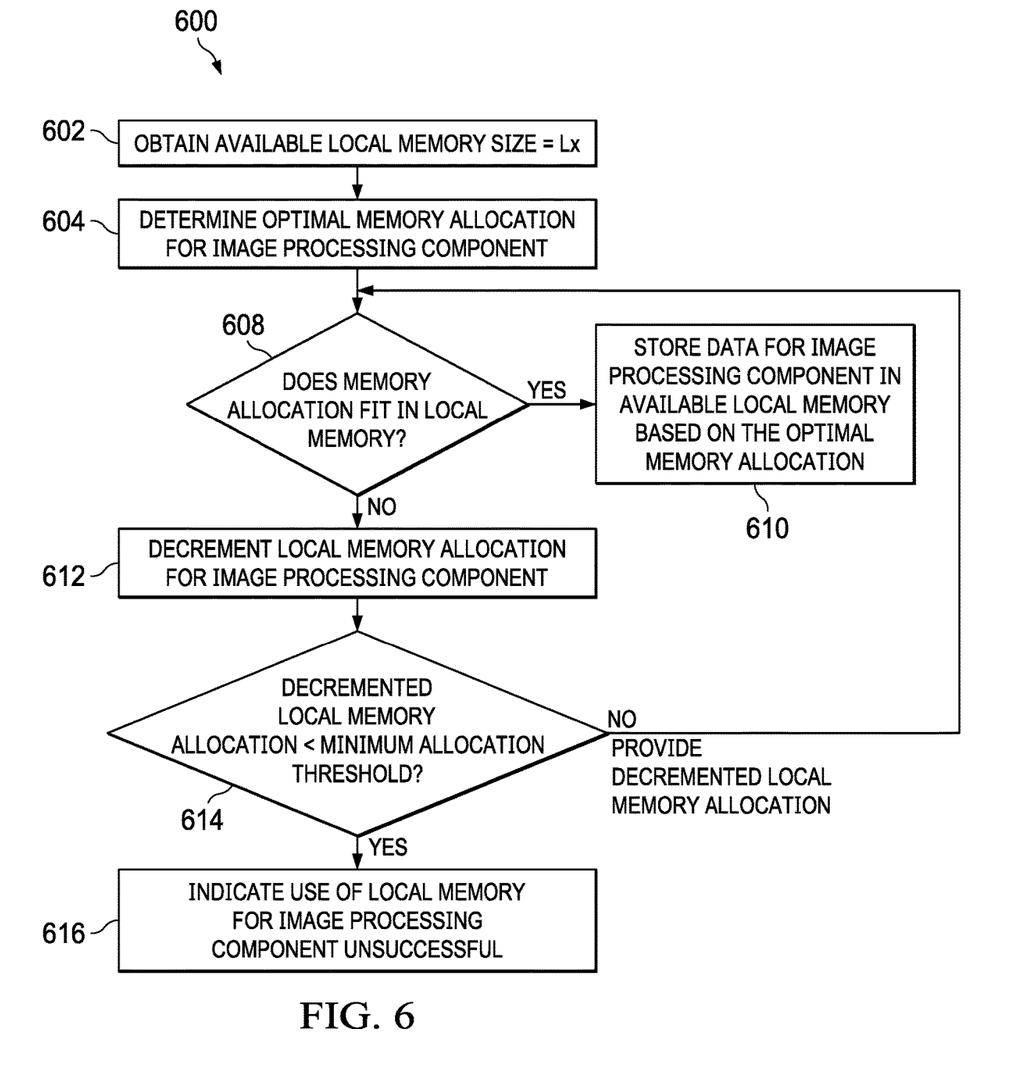
FIG. 6 is a flow chart of an image data flow control method in accordance with an example embodiment.

FIG. 6 is a flow chart of an image data flow control method 600 in accordance with an example embodiment. The method 600 may be performed by software offline and/or by a controller (e.g., controller 240 in FIG. 2) to determines an amount of local memory that is available and how available local memory will be used by one or more image processing components (e.g., the interfaces/processing elements 204, 208, 212, 216, 220, 224, and 230 in FIG. 2). In some example embodiments, the method 600 is performed for one image processing component (e.g., processing element 230 in FIG. 2) or multiple image processing components (e.g., some combinations of the interfaces/processing elements 204, 208, 212, 216, 220, 224, and 230 in FIG. 2). As shown, the method 600 includes obtaining an available local memory size (available size=Lx) at block 602. For example, the local memory size may be obtained in block 602 based on end-application. In different scenarios, an IC has a certain amount of memory available at a given time while other memory is used by other blocks in the system. As desired, the method 600 may change the manner in which image processing components operates on data in order to fit the output of the image processing circuit into local memory.

At block 604, an optimal memory allocation for an image processing component is determined. If the optimal memory allocation fits in the available local memory (determination block 608), data for the image processing component is stored in the available local memory based on the optimal memory allocation at block 610. If the optimal memory allocation does not fit in the available local memory (determination block 608), the local memory allocation for the image processing component is decremented at block 610. If the decremented local memory allocation is less than a minimum allocation threshold (determination block 614), use of local memory for the image processing component is indicated to be unsuccessful at block 616. If the decremented local memory allocation is not less than a minimum allocation threshold (determination block 614), the decremented local memory allocation is provided to block determination block 608, and the method 600 repeats.

In some example embodiment, the operations of block 604 involve determining an optimal output block size for a set of operations performed by the image processing circuit is determined. More specifically, bounding boxes may be created that include sets of output blocks for each row of blocks (or for one or more target rows of blocks) to determine the optimal memory allocation at block 604. In some example embodiments, the bounding boxes cover the full input lines for each respective row of blocks in the image to be processed. If the bounding boxes for the optimal memory allocation do not fit in the local memory size (determination block 608), the block size is decremented. If the decremented block size is greater than or equal to a minimum block size, the method 600 uses the decremented block size as the input block size. In some example embodiments, the minimum block size is fixed at a predetermined minimum block size (e.g., 8×2) based on various specifications of a given image processing component. In different example embodiments, image processing parameters, the input image, the size of the local memory, and/or other factors determine the extent to which local memory versus external memory is used for PTE operations.

In at least some embodiments, a system includes an imaging/vision subsystem with a PTE and HTS enhanced to support usage of local memory (e.g., L2 memory) to store entire blocks in a given row for PTE operations. The blocks stored in the local memory at a given time will be a fraction of the entire frame. There is also an option to store more blocks in other local memory (e.g., L3 memory) using a virtual DMA node. Even with this option, the blocks stored in the local memory at a given time will be a fraction of the entire frame.

Figure 7:
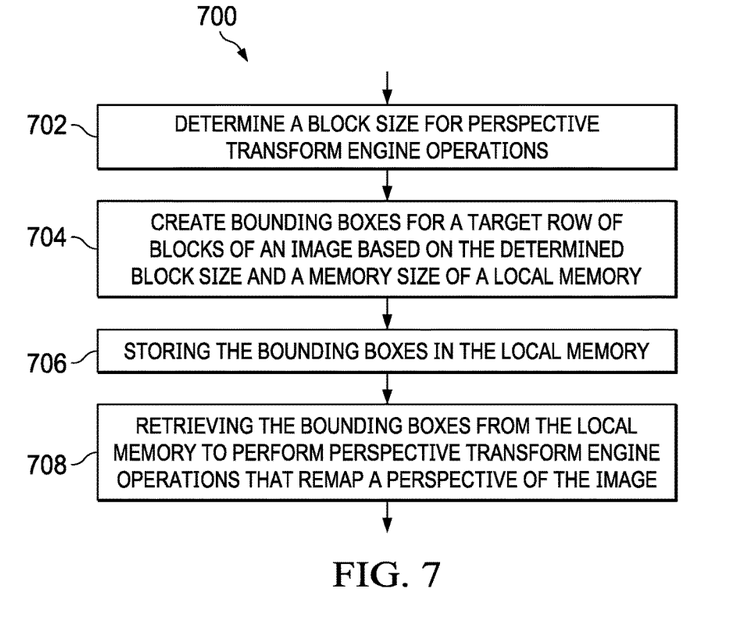
FIG. 7 is a flow chart of an image processing method in accordance with an example embodiment.

FIG. 7 is a flow chart of an image processing method 700 in accordance with an example embodiment. The method 700 includes a perspective transform operation as an example of an image processing operation and may be performed by an imaging/vision subsystem or circuit (e.g., the imaging/vision subsystem 408 in FIG. 4, or the imaging/vision circuitry 518 in FIG. 5). As shown, the method 700 includes determining a block size for PTE operations at block 702. In some examples, the operations of block 702 involve the algorithm 504 and/or method 600. At block 704, bounding boxes are created for a target row of blocks of an image based on the determined block size and a memory size of a local memory. At block 706, the bounding boxes are stored in the local memory. At block 708, the bounding boxes are retrieved from the local memory to perform PTE operations that remap a perspective of the image.

In some example embodiments, determining the block size at block 702 involves determining an optimal output block size for PTE operations. If an input bounding box fits in the local memory, the optimal output block size is used as the determined block size. If the optimal block size does not fit in the local memory, a decremented version of the optimal block size is used as the determined block size.

In some example embodiments, the bounding boxes are a first set of bounding boxes, and the method 700 also includes: creating a second set of bounding boxes for another target row of blocks; storing the second set of bounding boxes in an external memory; and retrieving the second set of bounding boxes from the external memory to perform PTE operations. The method 700 may also include scheduling transfers of bounding blocks between the local memory and the PTE based on an addressing scheme for a circular buffer. Other PTE method variations involving a local memory, or a local memory in combination with an external memory are possible. In some example embodiments, the PTE is configured to receive: a first set of the input blocks or input block portions from the local memory; and a second set of the input blocks or input block portions from an external memory. In some example embodiments, a PTE supports an option to store a first part of the image in local memory (e.g., Luma in a YUV image) and a second part of the image (e.g., Chroma in a YUV image) in external memory.

In this description, the term "couple" may cover connections, communications, or signal paths that enable a functional relationship consistent with this description. For example, if device A generates a signal to control device B to perform an action: (a) in a first example, device A is coupled to device B by direct connection; or (b) in a second example, device A is coupled to device B through intervening component C if intervening component C does not alter the functional relationship between device A and device B, such that device B is controlled by device A via the control signal generated by device A.

Modifications are possible in the described embodiments, and other embodiments are possible, within the scope of the claims.

What is claimed is:
1. An integrated circuit comprising:
   an image processing circuit configured to perform an image processing operation on an input image that includes a first set of blocks of pixels to produce an output image that includes a second set of blocks of pixels;

a local memory; and a scheduler coupled to the image processing circuit and to the local memory, wherein the scheduler is configured to:
  determine a block size for the image processing operation;
  determine whether to modify the block size based on an amount of available space in the local memory; and
  cause the image processing circuit to perform the image processing operation on the input image to produce the output image.

2. The integrated circuit of claim 1, wherein the scheduler is further configured to,
  couple to an external memory; and
  determine whether to utilize the local memory or the external memory to perform the image processing operation on the input image based on whether the modified block size is less than a minimum threshold, when it is determined to modify the block size.

3. The integrated circuit of claim 2, wherein:
  the image processing circuit is a first image processing circuit;
  the integrated circuit further comprises a second image processing circuit coupled to the local memory and to the scheduler;
  the second image processing circuit is configured to produce the input image for the first image processing circuit; and
  the scheduler is configured to cause the input image from the second image processing circuit to be stored in either the local memory or the external memory based on whether the modified block size is less than a minimum threshold.

4. The integrated circuit of claim 3, wherein the first image processing circuit includes a perspective transform engine, and the second image processing circuit includes one or more components of a line-based processing engine.

5. The integrated circuit of claim 4, wherein the one or more components includes at least one of a vision imaging sub-system processing element, a multi-scalar engine, and a noise filter.

6. The integrated circuit of claim 2, wherein the scheduler is further configured to determine whether to utilize the local memory or the external memory to store the output image based on whether the modified block size is less than the minimum threshold.

7. The integrated circuit of claim 2, wherein the minimum threshold includes a block height and a block width.

8. The integrated circuit of claim 1, wherein the local memory is configured as a circular buffer.

9. The integrated circuit of claim 1, wherein the local memory includes at least one of a level 2 (L2) or a level 3 (L3) cache.

10. The integrated circuit of claim 1, wherein:
  the local memory includes a level 3 (L3) cache; and
  the integrated circuit further comprises a direct-memory access (DMA) controller coupled to the local memory; and
  the image processing operation utilizes the DMA controller to access the L3 cache of the local memory.

11. The integrated circuit of claim 1, wherein the image processing operation includes a perspective transform operation.

12. The integrated circuit of claim 11, wherein the perspective transform operation includes a lens distortion correction operation.

13. A method comprising:
  receiving an input image;
  determining a block size for an image processing operation to perform on the input image, wherein the image processing operation is to be performed by an image processing circuit;
  determining an amount of available space in a memory that is coupled to the image processing circuit;
  determining whether to modify the block size based on the amount of available space in the memory; and
  performing the image processing operation on the input image using the image processing circuit to produce an output image.

14. The method of claim 13, wherein:
  the memory is a first memory; and
  the method further comprises determining whether to utilize the first memory or a second memory to perform the image processing operation based on whether the modified block size is less than a minimum threshold, when it is determined to modify the block size.

15. The method of claim 14 further comprising determining whether to store the input image in either the first memory or the second memory prior to the performing of the image processing operation based on whether the modified block size is less than a minimum threshold.

16. The method of claim 14 further comprising determining whether to store the output image in either the first memory or the second memory prior to the performing of the image processing operation based on whether the modified block size is less than a minimum threshold.

17. The method of claim 14, wherein the minimum threshold includes a block height and a block width.

18. The method of claim 13 wherein the memory includes at least one of a level 2 (L2) or a level 3 (L3) cache.

19. The method of claim 13, wherein the image processing operation includes a perspective transform operation.

20. The method of claim 19, wherein the perspective transform operation includes a lens distortion correction operation.

* * * * *